United States Patent
Kim et al.

(10) Patent No.: US 10,715,994 B2
(45) Date of Patent: Jul. 14, 2020

(54) METHOD AND APPARATUS FOR CONNECTING A TERMINAL TO NETWORK BASED ON APPLICABLE NETWORK INFORMATION IN MOBILE COMMUNICATION SYSTEM

(71) Applicant: Samsung Electronics Co., Ltd., Suwon-si, Gyeonggi-do (KR)

(72) Inventors: Sunghoon Kim, Seoul (KR); Youngkyo Baek, Seoul (KR); Jungje Son, Yongin-si (KR); Hoyeon Lee, Seongnam-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 0 days.

(21) Appl. No.: 15/790,449

(22) Filed: Oct. 23, 2017

(65) Prior Publication Data
US 2018/0115891 A1   Apr. 26, 2018

(30) Foreign Application Priority Data

Oct. 21, 2016   (KR) .......................... 10-2016-0137553

(51) Int. Cl.
*H04W 8/26* (2009.01)
*H04L 29/12* (2006.01)
*H04W 8/08* (2009.01)

(52) U.S. Cl.
CPC ........... *H04W 8/26* (2013.01); *H04L 61/1588* (2013.01); *H04L 61/2007* (2013.01); *H04W 8/08* (2013.01)

(58) Field of Classification Search
CPC . H04L 61/1588; H04L 61/2007; H04L 29/12; H04L 67/12; H04W 8/26;
(Continued)

(56) References Cited

U.S. PATENT DOCUMENTS

| 8,085,714 B2 * | 12/2011 | Sitomaniemi ......... H04W 76/38 370/328 |
| 8,139,530 B2 * | 3/2012 | Herrero-Veron ........ H04W 8/00 370/329 |

(Continued)

FOREIGN PATENT DOCUMENTS

| KR | 10-1378681 B1 | 3/2014 |
| KR | 10-2016-0088371 A | 7/2016 |

OTHER PUBLICATIONS

Motorola Mobility et al., Considerations for IP Session Continuity, SA WG2 Meeting #113AH, Feb. 29, 2016, pp. 1-5, Sophia Antipolis, France, S2-161020.

(Continued)

*Primary Examiner* — Man U Phan
(74) *Attorney, Agent, or Firm* — Jefferson IP Law, LLP

(57) ABSTRACT

A communication technology for converging a 5th-generation (5G) communication system for supporting a higher data rate after a 4th-generation (4G) system to an Internet of things (IoT) technology and a system thereof are provided. A method for connecting to a network by a terminal in a mobile communication system wherein a first communication network and a second communication network are operable, and an apparatus thereof are provided. The method includes transmitting, to a mobility management function, information on supportable communication network for the terminal and an attach request message including a packet data unit (PDU) session request, receiving an internet protocol (IP) address allocated based on the information on supportable communication network and an attach accept message including a PDU session response, and connecting to a network based on the IP address.

18 Claims, 5 Drawing Sheets

(58) Field of Classification Search
CPC ..... H04W 8/08; H04W 36/0011; H04W 4/06; H04W 8/065; H04W 36/12
USPC .......................................................... 370/254
See application file for complete search history.

(56) References Cited

U.S. PATENT DOCUMENTS

| | | | | |
|---|---|---|---|---|
| 10,015,797 | B2* | 7/2018 | Moses | H04W 36/30 |
| 10,356,184 | B2* | 7/2019 | Li | H04L 41/082 |
| 10,362,511 | B2* | 7/2019 | Youn | H04W 36/0011 |
| 10,367,721 | B2* | 7/2019 | Faccin | H04L 12/6418 |
| 10,462,656 | B2* | 10/2019 | Lee | H04W 12/02 |
| 2008/0233947 | A1 | 9/2008 | Herrero-Veron | |
| 2009/0086667 | A1 | 4/2009 | Sitomaniemi et al. | |
| 2011/0128913 | A1 | 6/2011 | Chowdhury et al. | |
| 2013/0308531 | A1 | 11/2013 | So et al. | |
| 2016/0095108 | A1* | 3/2016 | Ryoo | H04L 5/0007 370/329 |
| 2016/0269944 | A1 | 9/2016 | Li | |
| 2017/0244705 | A1* | 8/2017 | Ha | H04W 12/0609 |
| 2017/0289868 | A1* | 10/2017 | Faccin | H04W 36/30 |
| 2018/0014178 | A1* | 1/2018 | Baek | H04W 8/20 |
| 2018/0027610 | A1* | 1/2018 | Werner | H04W 36/0055 370/331 |
| 2018/0063135 | A1* | 3/2018 | Hahn | H04L 9/3271 |
| 2018/0103363 | A1* | 4/2018 | Faccin | H04L 12/66 |
| 2018/0103368 | A1* | 4/2018 | Son | H04W 8/26 |
| 2018/0103403 | A1* | 4/2018 | Van Lieshout | H04W 28/08 |
| 2018/0176768 | A1* | 6/2018 | Baek | H04W 8/183 |
| 2018/0192337 | A1* | 7/2018 | Ryu | H04W 36/0066 |
| 2018/0288657 | A1* | 10/2018 | Stojanovski | H04W 36/14 |
| 2018/0295556 | A1* | 10/2018 | Baek | H04W 8/20 |
| 2018/0324646 | A1* | 11/2018 | Lee | H04W 36/38 |
| 2018/0376384 | A1* | 12/2018 | Youn | H04W 36/0022 |
| 2018/0376444 | A1* | 12/2018 | Kim | H04W 60/04 |
| 2019/0007921 | A1* | 1/2019 | Schliwa-Bertling | H04W 60/00 |
| 2019/0029065 | A1* | 1/2019 | Park | H04W 60/06 |
| 2019/0053105 | A1* | 2/2019 | Park | H04W 36/0005 |
| 2019/0053117 | A1* | 2/2019 | Bae | H04W 76/30 |
| 2019/0053308 | A1* | 2/2019 | Castellanos Zamora | H04L 65/1016 |
| 2019/0098537 | A1* | 3/2019 | Qiao | H04W 36/0033 |
| 2019/0116631 | A1* | 4/2019 | Talebi Fard | H04W 80/10 |
| 2019/0124561 | A1* | 4/2019 | Faccin | H04W 76/16 |

OTHER PUBLICATIONS

Samsung: "Interworking between NextGen Core and EPC", 3GPP Draft; S2-164670 NGC-EPC Interworking, 3rd Generation Partnership Project (3GPP), Mobile Competence Centre ; 650, Route Des Lucioles ; F-06921 Sophia-Antipolis Cedex ; France 9 vol. SA WG2, No. Sanya, China; Aug. 29, 2016-Sep. 2, 2016 Aug. 23, 2016 (Aug. 23, 2016), XP051139225, pp. 2-4 and 7.

"3rd Generation Partnership Project; Technical Specification Group Services and System Aspects; Study on Architecture for Next Generation System (Release 14)", 3GPP Standard; 3GPP TR 23.799, 3rd Generation Partnership Project (3GPP), Mobile Competence Centre ; 650, Route Des Lucioles ; F-06921 Sophia-Antipolis Cedex ; France, vol. SA WG2, No. V1.0.2, Sep. 30, 2016 (Sep. 30, 2016), pp. 1-423, XP051172701 [retrieved on Sep. 30, 2016], pp. 52-55 and 352-355.

"3rd Generation Partnership Project; Technical Specification Group Services and System Aspects; General Packet Radio Service (GPRS) enhancements for Evolved Universal Terrestrial Radio Access Network (E-UTRAN) access (Release 13)", 3GPP Standard; 3GPP TS 23.401, 3rd Generation Partnership Project (3GPP), Mobile Competence Centre ; 650, Route Des Lucioles ; F-06921 Sophia-Antipolis Cedex ;France, vol. SA WG2, No. V13.7.0, Jun. 22, 2016 (Jun. 22, 2016), pp. 1-372, XP051123223 [retrieved on Jun. 22, 2016].

European Search Report dated, Jun. 4, 2019, issued in European Application No. 17861264.4-1214.

* cited by examiner

METHOD AND APPARATUS FOR CONNECTING A TERMINAL TO NETWORK BASED ON APPLICABLE NETWORK INFORMATION IN MOBILE COMMUNICATION SYSTEM

CROSS-REFERENCE TO RELATED APPLICATION(S)

This application claims the benefit under 35 U.S.C. § 119(a) of a Korean patent application filed on Oct. 21, 2016 in the Korean Intellectual Property Office and assigned Serial number 10-2016-0137553, the entire disclosure of which is hereby incorporated by reference.

TECHNICAL FIELD

The present disclosure relates to a method and an apparatus for connecting a terminal to a network in a mobile communication system. More particularly, the present disclosure relates to a method and an apparatus for allocating an internet protocol (IP) address to a terminal based on applicable network information.

BACKGROUND

In order to meet the demand for wireless data traffic that is on an increasing trend after commercialization of 4th-generation (4G) communication systems, efforts have been made to develop improved 5th-generation (5G) or pre-5G communication system. For this reason, the 5G or pre-5G communication system is also called a beyond 4G network communication system or a post long-term evolution (LTE) system. In order to achieve a high data rate, implementation of a 5G communication system in an ultrahigh frequency (mm Wave) band (e.g., like a 60 GHz band) has been considered. In order to mitigate a path loss of radio waves and to increase a transfer distance of the radio waves in the ultrahigh frequency band, technologies of beamforming, massive multiple input, multiple output (MIMO), full dimension MIMO (FD-MIMO), array antennas, analog beamforming, and large-scale antennas for the 5G communication system have been discussed. Furthermore, for system network improvement, in the 5G communication system, development of technologies such as an evolved small cell, an advanced small cell, a cloud radio access network (cloud RAN), an ultra-dense network, device to device communication (D2D), a wireless backhaul, a moving network, cooperative communication, coordinated multi-points (CoMP), and reception interference cancellation has been made. In addition, hybrid frequency shift keying (FSK) and quadrature amplitude modulation (QAM) modulation (FQAM) and sliding window superposition coding (SWSC), which correspond to advanced coding modulation (ACM) systems, and filter bank multicarrier (FBMC), non-orthogonal multiple access (NOMA) and sparse code multiple access (SCMA), which correspond to advanced access technology, have been developed in the 5G system.

On the other hand, the Internet, which is a human centered connectivity network where human beings generate and consume information, is now evolving to the Internet of things (IoT) network where distributed entities, such as things, exchange and process information. The Internet of everything (IoE), which is a combination of the IoT technology and big data processing technology through connection with a cloud server, has emerged. As technology elements, such as a sensing technology, wired/wireless communication and a network infrastructure, a service interface technology, and a security technology, have been demanded for IoT implementation, technologies such as a sensor network for machine-to-machine (M2M) connection, M2M communication, machine type communication (MTC), and so forth have been recently researched. Such an IoT environment may provide intelligent internet technology (IT) services that create a new value to human life by collecting and analyzing data generated among connected things. The IoT may be applied to a variety of fields including smart homes, smart buildings, smart cities, smart cars or connected cars, smart grid, health care, smart appliances and advanced medical services through convergence and combination between the existing information technology (IT) and various industries.

Accordingly, various attempts have been made to apply the 5G communication system to IoT networks. For example, technologies of a sensor network, M2M communication, and MTC have been implemented by techniques for beamforming, MIMO, and array antennas, which correspond to the 5G communication technology. As the big data processing technology as described above, application of a cloud radio access network (cloud RAN) would be an example of convergence between the 5G technology and the IoT technology.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method in which a mobile communication provider provides interworking between a 4th-generation (4G) mobile communication system and a 5th-generation (5G) mobile communication system to a terminal capable of using both the 4G mobile communication system and the 5G mobile communication system, provides a negotiation procedure and negotiation information on whether the terminal can use the 4G and the 5G between the terminal and a network in order to provide continuous internet protocol (IP) connectivity to the terminal, and sets a network (that is, a gateway) for 4G-5G interworking in the terminal based on the negotiation procedure and the negotiation information.

In accordance with an aspect of the present disclosure, a method for connecting to a network by a terminal in a mobile communication system wherein a first communication network and a second communication network are operable is provided. The method includes transmitting, to a mobility management function, information on supportable communication network for the terminal and an attach request message including a packet data unit (PDU) session request, receiving an internet protocol (IP) address allocated based on the information on supportable communication network and an attach accept message including a PDU session response, and connecting to a network based on the IP address.

In accordance with another aspect of the present disclosure, a method for allocating a network by a mobility management function in a mobile communication system wherein a first communication network and a second communication network are operable is provided. The method includes receiving, from a terminal information on supportable communication network for the terminal and an attach request message including a packet data unit (PDU) session request, selecting a session management function (SMF) which allocates an internet protocol (IP) address to the terminal based on the information on supportable communication network, receiving, from the selected SMF, a PDU session response message including an allocated IP address, and transmitting, to the terminal an attach accept message including the PDU session response message.

In accordance with still another aspect of the present disclosure, a method for allocating a network by a session management function (SMF) in a mobile communication system wherein a first communication network and a second communication network are operable is provided. The method includes receiving, from a mobility management function, a packet data unit (PDU) session request message including information on supportable communication network for a terminal, establishing a PDU session based on the information on supportable communication network and determining an internet protocol (IP) address to be allocated to a terminal, and transmitting, to the mobility management function, a PDU session response message including the IP address.

In accordance with yet another aspect of the present disclosure, a terminal of a mobile communication system wherein a first communication network and a second communication network are operable is provided. The terminal includes a terminal transceiver configured to transmit, to a mobility management function, information on supportable communication network for the terminal and an attach request message including a packet data unit (PDU) session request and to receive an internet protocol (IP) address allocated based on the information on supportable communication network and an attach accept message including a PDU session response, and a terminal controller configured to connect to a network based on the IP address.

In accordance with yet another aspect of the present disclosure, a mobility management function of a mobile communication system where a first communication network and a second communication network are operable is provided. The mobility management function includes a mobility management function transceiver configured to receive, from a terminal, information on supportable communication network for the terminal and an attach request message including a packet data unit (PDU) session request, receive, from a session management function (SMF), a PDU session response message including an allocated IP address, and transmit, to the terminal, an attach accept message including the PDU session response message, and a mobility management function controller configured to select a SMF, which allocates an IP address to the terminal, based on the information on supportable communication network.

In accordance with yet another aspect of the present disclosure, a session management function (SMF) of a mobile communication system wherein a first communication network and a second communication network are operable is provided. The SMF includes a SMF transceiver configured to receive, from a mobility management function, a packet data unit (PDU) session request message including information on supportable communication network for a terminal and transmit, to the mobility management function a PDU session response message including an IP address, and a SMF controller configured to establish a PDU session based on the information on supportable communication network, and determine an IP address to be allocated to the terminal.

According to the aspects of the present disclosure, a service provider operating both the 4G mobile communication system and the 5G mobile communication system and a terminal using both the 4G mobile communication system and the 5G mobile communication system can exchange information necessary for mutual 4G-5G interworking, thereby providing the same IP connectivity service between the 4G mobile communication system and the 5G mobile communication system.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
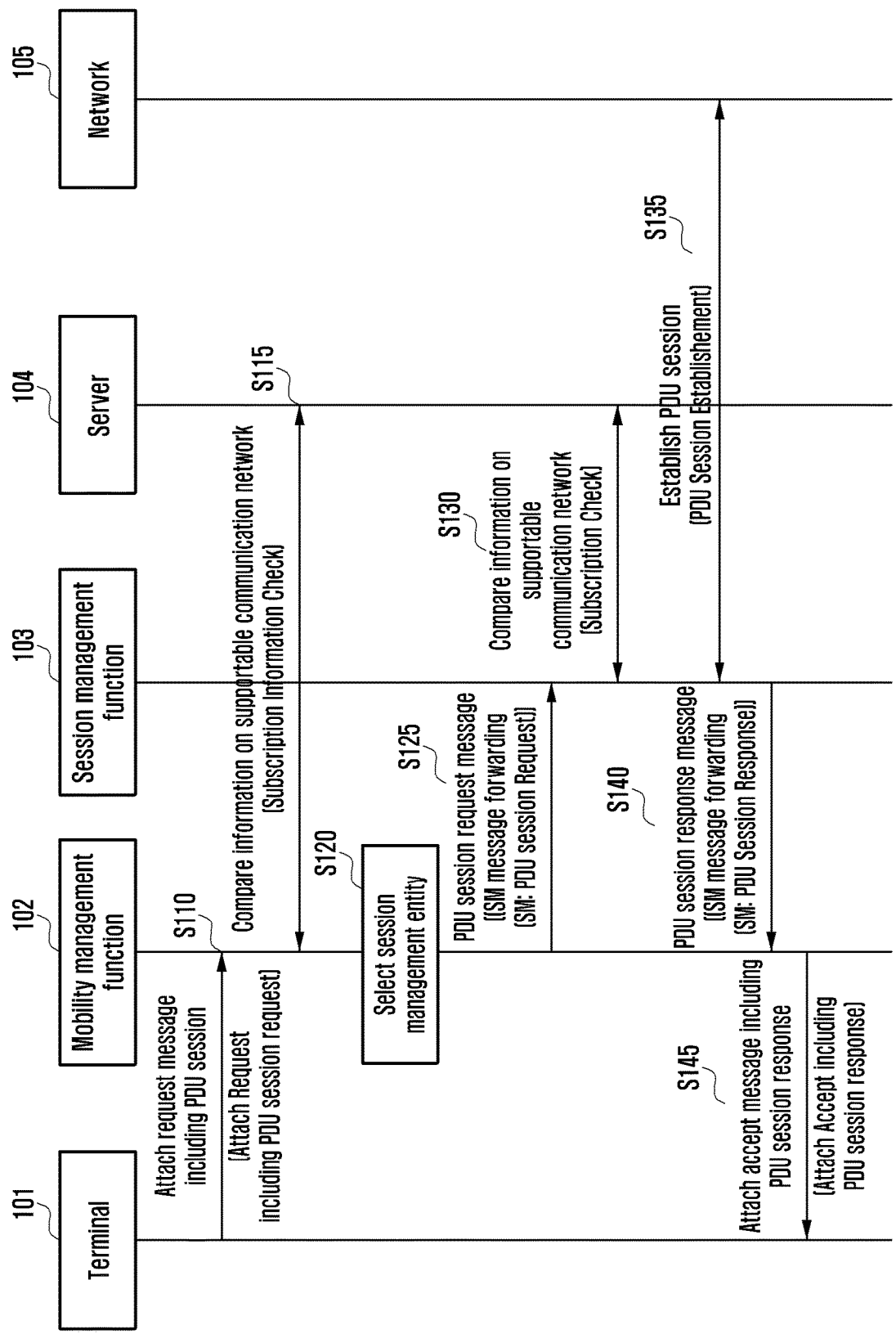
FIG. 1 is a diagram illustrating a method in which a terminal connects to a network, negotiates regarding whether 4th-generation (4G) and 5th-generation (5G) services are available and simultaneously establishes a packet data unit (PDU) session according to the negotiation, according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In detailed description of embodiments of the present disclosure, a radio access network (RAN), and a new RAN (NR) and a packet core next generation core (NG core), which are core networks, will be mainly described, 5th-generation (5G) network standard of these networks being defined by the 3$^{rd}$ generation partnership project (3GPP). However, the subject matter of the present disclosure can be applied to other communication systems having similar technical backgrounds through slight modification without largely departing from the scope of the present disclosure, and this will be possible through the judgment of those skilled in the art in the technical field of the present disclosure.

Hereinafter, for the convenience of description, terms and names defined in the 3GPP Long-Term Evolution (LTE) standard may be partially used. However, the present disclosure is not limited by the terms and names and can also be applied to systems conforming to other standards in the same manner.

Entities used in the present disclosure will be described as follows.

A terminal user equipment (UE) is connected to a radio access network (RAN) and connects to a mobility management function of a core network device of 5G. In the present disclosure, the mobility management function may be replaced with a common control network function (CCNF), wherein the CCNF performs terminal authentication together with the mobility management function. The mobility management function or the CCNF including the same routes a session-related message for a terminal to a session management function (SMF). The CCNF is connected to the SMF, wherein the SMF is connected to a network to allocate resources to be provided to the terminal, thereby establishing a tunnel for transmitting data between a base station and the network. In the present disclosure, a device called the mobility management function may represent a core network device including the mobility management function, that is, the CCNF or a device that receives a network attached storage (NAS) message of a terminal having another name. For the purpose of convenience, in the present disclosure, it is called the mobility management function.

A network slice instance represents a service provided by a network including the CCNF, the SMF, and a user plane function (UPF). For example, when a mobile communication provider supports a wideband communication service, the mobile communication provider defines a network service satisfying requirements for the wideband communication, configures the network service as a network slice instance, and provides the service. When the mobile communication provider supports an IoT service, the mobile communication provider defines a network service satisfying requirements for the IoT service, configures the network service as a network slice instance for IoT, and provides the service.

4G represents 4$^{th}$ generation mobile communication and includes a radio access network (RAN) technology called LTE and a core network technology called an evolved packet core (EPC). 5G represents 5$^{th}$ generation mobile communication. A RAN technology of the 5G is called next generation RAN (NG-RAN) and a core network technology is called next generation core (NG-core). A mobile communication provider can provide both the 4G and the 5G. A terminal can use both the 4G and the 5G when it has both a 4G modem and a 5G modem. A terminal capable of using both the 4G and the 5G can use the 4G in an area, where only the 4G service is possible, while using the 5G in an area, where the 5G service is possible, according to a service coverage provided by the mobile communication provider. In order to allow one terminal to use services by changing two types of mobile communication systems, interworking between the 4G network and the 5G network is required. To this end, the 4G core network and the 5G core network should cooperate with each other. The present disclosure provides a method in which a terminal capable of using both the 4G and the 5G negotiates with a 5G core network regarding whether the terminal can use both the 4G and the 5G, the 4G core network and the 5G core network allocate one IP address to the terminal according to the negotiation result, and both systems establish a session in order to continuously provide IP connectivity.

First embodiment—FIG. 1 is a diagram illustrating a method in which a terminal connects to a network, negotiates regarding whether 4G and 5G services are available and simultaneously establishes a packet data unit (PDU) session according to the negotiation, according to an embodiment of the present disclosure.

Referring to FIG. 1, a terminal has Capability capable of using both the 4G and the 5G. The terminal connects to the 5G network and performs an Attach procedure with the 5G core network in order to use a mobile communication service. The Attach procedure is performed between the terminal and the mobility management function.

1. A terminal 101 generates a mobile management (MM) message called Attach Request at operation S110. In this case, the terminal 101 may put Capability into an information element (IE) of the Attach Request message, the Capability representing that the terminal 101 can use both the 4G and the 5G. The Capability may have one type of 4G-5G interworking available, 4G radio capability/5G radio capability, 4G supported and 5G preferred, and 4G preferred and 5G supported.

That is, the Capability may represent whether the terminal 101 can perform the 4G-5G interworking, has the 4G radio capability or the 5G radio capability, supports the 4G and prefers the 5G, or prefers the 4G and supports the 5G. The terminal 101 may prefer the 5G service in an area where both the 4G and the 5G are possible, or prefers the 4G but may connect to the 5G network because only the 5G is provided in a current area. In the former case, the terminal 101 may transfer the capability representing the 4G supported and 5G preferred. In the latter case, the terminal 101 may transfer the capability representing the 4G preferred and 5G supported.

For connecting to a packet data network, the terminal 101 may put a PDU Session Request, which is a session management (SM) message, into the Attach Request message, and transmit the Attach Request message. The terminal 101 may put the Capability, which represents that the terminal 101 can use both the 4G and the 5G, into the PDU session request. Alternatively, since the terminal 101 desires to establish connectivity to the packet data network in which the terminal 101 can use both the 4G and the 5G, the terminal 101 may put a name of the Packet Data Network for supporting the 4G-5G interworking, such as an access point name (APN) and a data network name (DNN), into the PDU session request message. This is transferred to a session management function (SMF) 103 through operation 125, and the SMF 103 may check the APN or the DNN to recognize that the terminal 101 uses both the 4G and the 5G and establish a PDU session enabling the 4G-5G interworking in the terminal 101.

Even though the terminal 101 does not put the Capability into the SM message, a mobility management function 102 may inform the SMF 103 of the fact that the terminal 101 uses both the 4G and the 5G through the fourth procedure (SM message forwarding) at operation S125.

Even though the terminal 101 does not put the Capability into the SM message and does not input the APN or the DNN for the 4G-5G interworking, the SMF 103 may check subscription information of the terminal 101 acquired after the sixth procedure at operation S130, check the 4G-5G interworking Capability from the subscription information, and establish a PDU session for the 4G-5G interworking Capability.

2. The mobility management function (MMF) having received the Attach request message may check the Capability information of the terminal 101 and recognize that the terminal 101 can use both the 4G and 5G services at operation S115. The mobility management function 102 performs a procedure for checking a server 104 (a server storing user subscription information) and the subscription information of the terminal 101. Through this procedure, the mobility management function 102 may check that the terminal 101 can use both the 4G and 5G services in a corresponding mobile communication network. This may be checked by comparing Capability of the terminal 101 acquired from the server 104 with the Capability of the terminal 101 acquired in the first procedure. Alternatively, the mobility management function 102 may transfer the Capability of the terminal 101 to the server 104, and the server 104 may perform a permission procedure and then transfer a response for the permission procedure to the mobility management function 102.

After performing the operation, the mobility management function 102 may perform a Network Slice Instance Selection procedure in order to allocate a Network Slice Instance to the terminal 101. In this case, the mobility management function 102 may perform Network Slice Instance Selection in consideration of whether the terminal 101 uses both the 4G and 5G services checked in the above procedure. That is, the mobility management function 102 may select a Network Slice Instance supporting the 4G-5G interworking and allocate the Network Slice Instance to the terminal 101.

3. The mobility management function 102 performs a procedure for selecting the session management function (SMF) 103 in order to transfer the SM message received in the first procedure to the SMF 103 at operation S120. In this case, in consideration of whether the terminal 101 can use both the 4G and 5G services acquired in the Attach procedure, the mobility management function 102 selects the SMF 103 enabling the 4G-5G interworking. The SMF 103 may be a SMF 103 belonging to a specific Network Slice Instance.

4. The mobility management function 102 transfers the PDU session request sent by the terminal 101 to the selected SMF 103 at operation S125. In this case, the mobility management function 102 may transfer whether the terminal 101 can use both the 4G and the 5G (the 4G-5G interworking Capability) acquired through the Attach procedure to the selected SMF 103 together with the PDU session request. The mobility management function 102 may transfer this as a part of the Subscription information of the terminal 101 or as an explicit IE.

5. After receiving the message, the SMF 103 may negotiate with the server 104 in order to acquire subscription information for the terminal 101 at operation S130. This procedure may be omitted, and in this case, the mobility management function 102 may transfer the subscription information of the terminal 101 acquired in the Attach procedure to the session management function 103 through the fourth procedure.

6. The SMF 103 may check the 4G-5G interworking Capability included in the PDU Session Request message sent by the terminal 101, the APN/the DNN included in the PDU Session Request message, the '4G-5G interworking Capability of the terminal 101' included in the message including the PDU Session Request message sent by the MMF, or the 4G-5G interworking Capability in the subscription information of the terminal 101 sent by the mobility management function 102, thereby judging that it is necessary to establish a PDU session required for the 4G-5G interworking in the terminal 101. After the judgment procedure, the SMF 103 selects a network 105 which is used in both a 4G system and a 5G system. Since IP connectivity of the terminal 101 is provided through the network 105, the terminal 101 can use a Packet Data Network service with one IP address in the 4G system and the 5G system. When there occurs a change between the 4G system and the 5G system, since the IP address is continuously anchored through the network 105, the terminal 101 can use a continuous Packet Data Network service. In the 4G system, the user plane function (UPF) is considered like a packet data network gateway (P-GW). In another example, the SMF may perform a domain name system (DNS) query based on the APN or the DNN value for the 4G-5G interworking sent by the terminal 101, thereby acquiring an IP address of a corresponding UPF.

The session management function (SMF) 103 having selected the network 105 performs a procedure for establishing a PDU session for the terminal 101 in the network 105 at operation S135. This is called PDU session Establishment in the present disclosure. This message may include the 4G-5G interworking Capability of the terminal 101.

7. After establishing the PDU session enabling the 4G-5G interworking for the terminal 101, the SMF 103 generates a response (e.g., a PDU session response) for the PDU Session Request, which is the SM message sent by the terminal 101, and transfers the response to the mobility management function 102 at operation S140. In this case, the SMF 103 may transfer the IP address of the network 105 for the PDU session established to the terminal 101 to the mobility management function 102. The mobility management function 102 may preserve this information as a Context of the terminal 101 and update the information to the server 104, and the server 104 may store the IP address of the network 105 provided to the terminal 101, so that the 4G system and the 5G system can check the IP address of the network 105 included in subscription information later, and always allocate the network 105 to the terminal 101 to maintain continuity of IP connectivity. In another example, the SMF 103 may directly update the IP address of the network 105 to the server 104.

8. The mobility management function 102 puts the PDU session response message received through the seventh procedure into an Attach Accept serving as a response MM message for the first message, and transfers the Attach Accept to the terminal 101 at operation S145. The mobility management function 102 puts Capability information indicating that the terminal 101 can use both the 4G and 5G services into the MM message, thereby representing that the terminal 101 uses both the 4G and 5G services. This may have the type as described in the first procedure. This is not limited to the name of the Attach Accept and represents all messages indicating a response for the first message.

The terminal 101 may judge the establishment of the PDU session enabling the 4G-5G interworking through the information included in the PDU session response. The information may be an IE representing the 4G-5G interworking Capability, or an IE including an APN or DNN value requested in order to use the 4G-5G interworking service.

Figure 2:
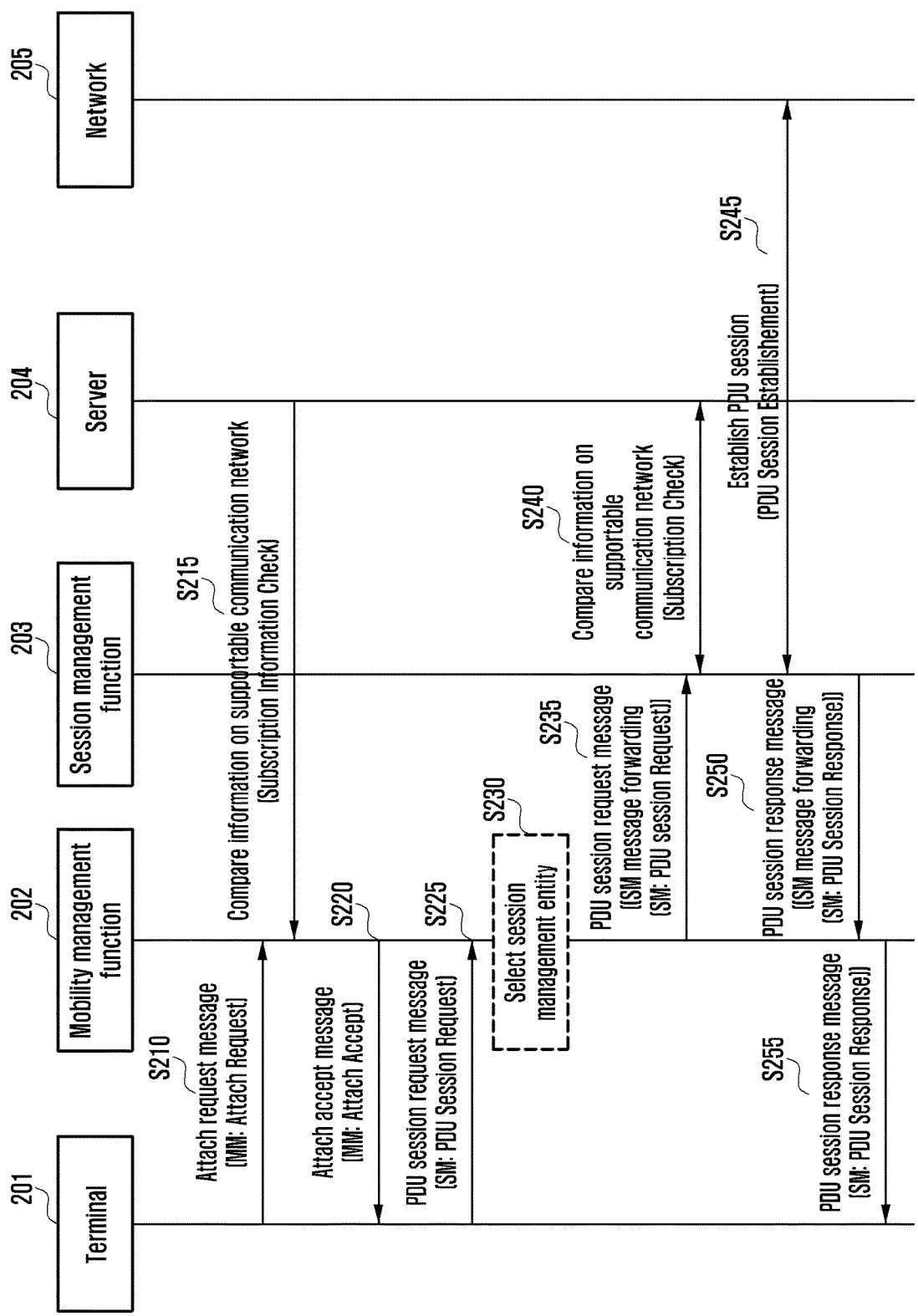
FIG. 2 is a diagram illustrating a method in which a terminal connects to a network, negotiates regarding whether 4G and 5G services are available and simultaneously establishes a PDU session according to the negotiation, according to an embodiment of the present disclosure.

Second embodiment—FIG. 2 is a diagram illustrating a method in which a terminal connects to a network, negotiates regarding whether 4G and 5G services are available and simultaneously establishes a PDU session according to the negotiation, according to an embodiment of the present disclosure.

1. A terminal 201 generates a MM message called Attach Request at operation S210. In this case, the terminal 201 may put Capability into an information element (IE) of the Attach Request message, the Capability representing that the terminal 201 can use both the 4G and the 5G. The Capability may have one type of 4G-5G interworking available, 4G radio capability/5G radio capability, 4G supported and 5G preferred, and 4G preferred and 5G supported.

That is, the Capability may represent whether the terminal 201 can perform the 4G-5G interworking, has the 4G radio capability or the 5G radio capability, supports the 4G and prefers the 5G, or prefers the 4G and supports the 5G. The terminal 201 may prefer the 5G service in an area where both the 4G and the 5G are possible, or prefers the 4G but may connect to the 5G network because only the 5G is provided in a current area. In the former case, the terminal 201 may transfer the capability representing the 4G supported and 5G preferred. In the latter case, the terminal 201 may transfer the capability representing the 4G preferred and 5G supported.

2. The mobility management function 202 having received the Attach request message may check the Capability information of the terminal 201 and recognize that the terminal 201 can use both the 4G and 5G services at operation S215. The mobility management function 202 performs a procedure for checking a server 204 (a server storing user subscription information) and the subscription information of the terminal 201. Through this procedure, the mobility management function 202 may check that the terminal 201 can use both the 4G and 5G services in a corresponding mobile communication network. This may be checked by comparing Capability of the terminal 201 acquired from the server 204 with the Capability of the terminal 201 acquired in the first procedure. Alternatively, the mobility management function 202 may transfer the Capability of the terminal 201 to the server 204, and the server 204 may perform a permission procedure and then transfer a response for the permission procedure to the mobility management function 202.

After performing the operation, the mobility management function 202 may perform a Network Slice Instance Selection procedure in order to allocate a Network Slice Instance to the terminal 201. In this case, the mobility management function 202 may perform Network Slice Instance Selection in consideration of whether the terminal 201 uses both the 4G and 5G services checked in the above procedure. That is, the mobility management function 202 may select a Network Slice Instance supporting the 4G-5G interworking and allocate the Network Slice Instance to the terminal 201.

3. The mobility management function 202 sends an Attach Accept, which is a MM message, to the terminal 201 as a response for the first message at operation S220. This is not limited to the name of the Attach Accept and represents all messages indicating a response for the first message. The mobility management function 202 puts Capability information indicating that the terminal 201 can use both the 4G and 5G services into the message, thereby representing that the terminal 201 uses both the 4G and 5G services. This may have the type as described in the first procedure.

4. The terminal 201 performs a SM procedure in order to connect to a Packet Data Network at operation S225. In the present disclosure, this is called a packet data unit (PDU) session request. This is not limited to the name and represents all messages transferred by the terminal 201 in order to establish connectivity to the packet data network. The terminal 201 may put Capability representing that the terminal 201 can use both the 4G and the 5G into the PDU session request. Alternatively, since the terminal 201 desires to establish connectivity to the Packet Data Network in which the terminal 201 can use both the 4G and the 5G, the terminal 201 may put a name of the Packet Data Network supporting the 4G-5G interworking, such as an access point name (APN) and a data network name (DNN) indicating the connectivity, into the PDU session request message. This is transferred to a SMF 203 through operation 225, and the SMF 203 may check the APN or the DNN to recognize that the terminal 201 uses both the 4G and the 5G and establish a PDU session enabling the 4G-5G interworking in the terminal 201.

Even though the terminal 201 does not put the Capability into the SM message, the mobility management function 202 may inform the SMF 203 of the fact that the terminal 201 uses both the 4G and the 5G through the fifth and sixth procedures.

Even though the terminal 201 does not put the Capability into the SM message and does not input the APN or the DNN for the 4G-5G interworking, the SMF 203 may check subscription information of the terminal 201 acquired after the sixth procedure, check the 4G-5G interworking Capability from the subscription information, and establish a PDU session for the 4G-5G interworking Capability.

5. The mobility management function 202 performs a procedure for selecting the SMF 203 in order to transfer the SM message received in the fourth procedure to the SMF 203 at operation S230. In this case, in consideration of whether the terminal 201 can use both the 4G and the 5G acquired in the Attach procedure, the mobility management function 202 selects the SMF 203 enabling the 4G-5G interworking. This may be the SMF 203 belonging to a specific Network Slice Instance.

6. The mobility management function 202 transfers the PDU session request sent by the terminal 201 to the selected SMF 203 at operation S235. In this case, the mobility management function 202 may transfer whether the terminal 201 can use both the 4G and the 5G (that is, the 4G-5G interworking Capability) acquired through the Attach procedure to the SMF 203 together with the PDU session request.

7. After receiving the message, the SMF 203 may negotiate with the server 204 in order to acquire subscription information for the terminal 201 at operation S240. This procedure may be omitted, and in this case, the mobility management function 202 may transfer the subscription information of the terminal 201 acquired in the Attach procedure to the SMF 203 through the sixth procedure.

8. The SMF 203 may check the 4G-5G interworking Capability included in the PDU Session Request message sent by the terminal 201, the APN/the DNN included in the PDU Session Request message, the '4G-5G interworking Capability of the terminal 201' included in the message including the PDU Session Request message sent by the MMF, or the 4G-5G interworking Capability in the subscription information of the terminal 201 sent by the mobility management function 202, thereby judging that it is necessary to establish a PDU session required for the 4G-5G interworking in the terminal 201. After the judgment procedure, the SMF selects a network 205 which is used in both a 4G system and a 5G system. Since IP connectivity of the terminal 201 is provided through the network 205, the terminal 201 can use a Packet Data Network service with one IP address in the 4G system and the 5G system. When there occurs a change between the 4G system and the 5G system, since the IP address is continuously anchored through the network 205, the terminal 201 can use a continuous Packet Data Network service. In the 4G system, the network 205 is considered like a P-GW. In another example, the session management function (SMF) 203 may perform a domain name system (DNS) query based on the APN or the DNN value for the 4G-5G interworking sent by the terminal 201, thereby acquiring an IP address of a corresponding UPF.

The SMF 203 having selected the network 205 performs a procedure for establishing a PDU session for the terminal 201 in the network 205 at operation S245. This is called PDU session Establishment in the present disclosure. This message may include the 4G-5G interworking Capability of the terminal 201.

9. After establishing the PDU session enabling the 4G-5G interworking for the terminal 201, the SMF 203 generates a response (e.g., a PDU session response) for the PDU Session Request, which is the SM message sent by the terminal 201, and transfers the response to the mobility management function 202 at operation S250. In this case, the SMF 203 may transfer the IP address of the network 205 for the PDU session established to the terminal 201 to the mobility management function 202. The mobility management function 202 may preserve this information as a Context of the terminal 201 and update the information to the server 204, and the server 204 may store the IP address of the network 205 provided to the terminal 201, so that the 4G system and the 5G system can check the IP address of the network 205 included in subscription information later, and always allocate the network 205 to the terminal 201 to maintain continuity of IP connectivity. In another example, the SMF 203 may directly update the IP address of the network 205 to the server 204.

10. The mobility management function 202 transfers the PDU session response message received through the ninth procedure to the terminal 201 at operation S255. The terminal 201 may judge the establishment of the PDU session enabling the 4G-5G interworking through the information included in the PDU session response. The information may be an IE representing the 4G-5G interworking Capability, or an IE including an APN or DNN value requested in order to use the 4G-5G interworking service.

It should be noted that the scope of the present disclosure is not limited to the names of the devices constituting the present disclosure. For example, the mobility management function 202 according to the present disclosure may include an access and mobility management function (AMF) that performs the same operations, the SMF 203 according to the present disclosure may include a SMF, and the server 204 according to the present disclosure may include a user data respository (UDR).

Figure 3:
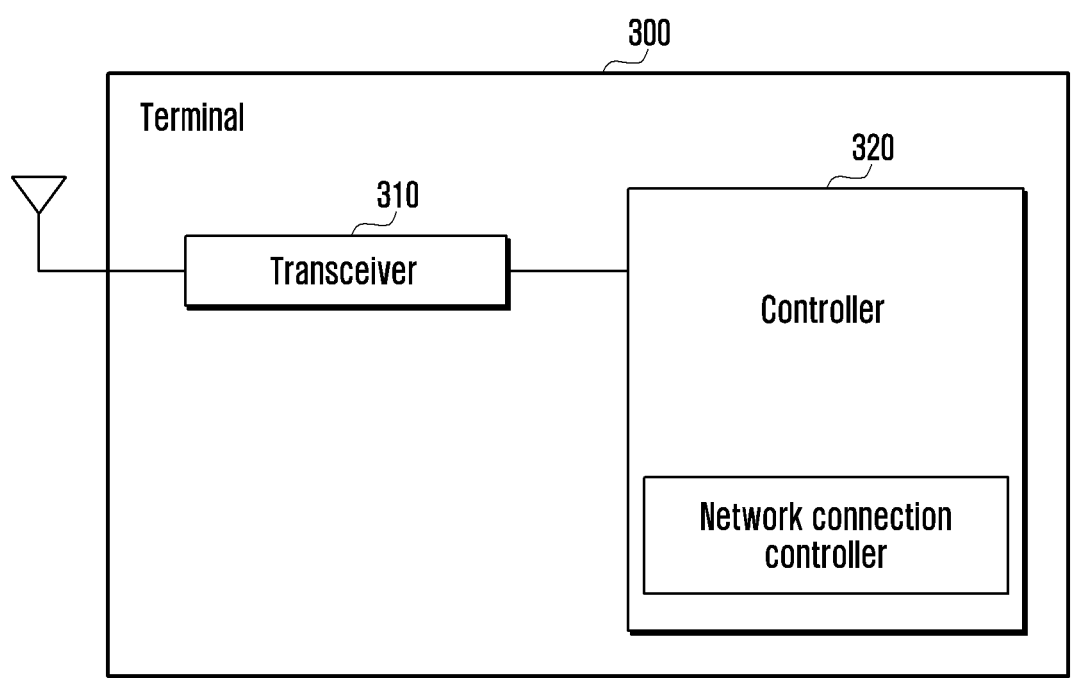
FIG. 3 is a diagram illustrating a structure of a terminal according to an aspect of the present disclosure.

FIG. 3 is a diagram illustrating a structure of a terminal according to an aspect of the present disclosure.

Referring to FIG. 3, a structure of a terminal 300 according to the present disclosure may include a terminal transceiver 310 that transmits applicable communication network information and an attach request message with a PDU session request to a mobility management function and receives an IP address allocated based on the applicable communication network information and an attach accept message with a PDU session response, and a terminal controller 320 that connects to a network based on the IP address.

Figure 4:
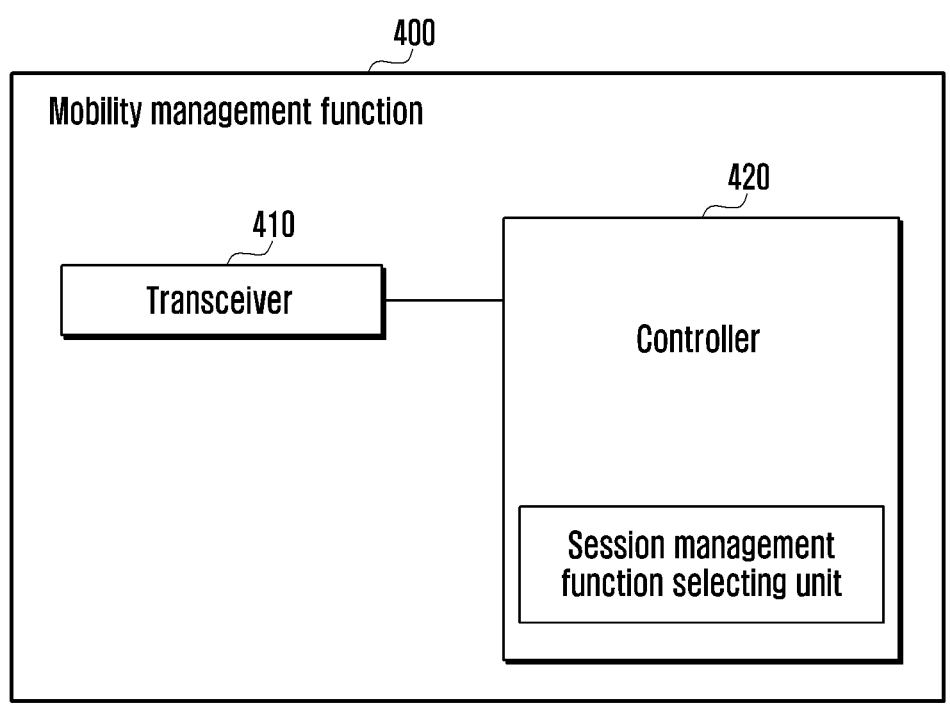
FIG. 4 is a diagram illustrating a structure of a mobile management function according to an aspect of the present disclosure.

FIG. 4 is a diagram illustrating a structure of a mobile management function according to an aspect of the present disclosure. Referring to FIG. 4, a structure of a mobility management function 400 according to the present disclosure may include a mobility management function transceiver 410 that receives the applicable communication network information and the attach request message with a PDU session request from the terminal, receives a PDU session response message with an allocated IP address from a SMF, and transmits an attach accept message with the PDU session response message to the terminal, and a mobility management function controller 420 that selects a SMF, which allocates an IP address to the terminal, based on the applicable communication network information.

Figure 5:
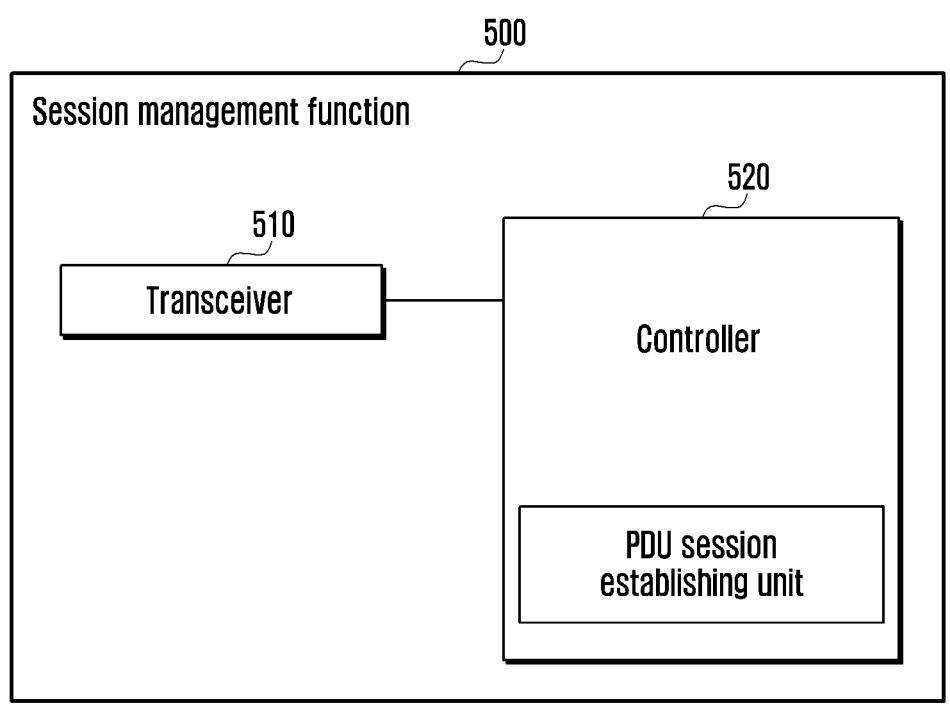
FIG. 5 is a diagram illustrating a structure of a session management function (SMF) according to an aspect of the present disclosure.

FIG. 5 is a diagram illustrating a structure of a session management function (SMF) according to an aspect of the present disclosure. Referring to FIG. 5, a structure of a SMF 500 according to the present disclosure may include a SMF transceiver 510 that receives a PDU session request message with applicable communication network information from a mobility management function and transmits a PDU session response message with the IP address to the mobility management function, and a SMF controller 520 that generates a PDU session based on the applicable communication network information and decides an IP address to be allocated to the terminal.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method by a terminal in a first network of a mobile communication system, the method comprising:
transmitting, to an entity implementing a mobility management function in a first network of a mobile communication system, first information indicating whether the terminal supports a second network and access point name (APN) information,
wherein second information on an entity implementing a session management function is determined, by the entity implementing the mobility management function, based on the first information and the APN information,
wherein a request for creating a packet data unit (PDU) session for the terminal is transmitted, by the entity implementing the mobility management function of the first network, to the entity implementing the session management function of the first network, and
wherein the second information on the entity implementing the session management function is transmitted to a server.

2. The method of claim 1,
wherein third information is transmitted from the server to the entity implementing the session management function, the third information on an entity implementing the session management function updated in the server by an entity implementing the session management function of the second network, in case that the PDU session is created in the second network, and wherein the entity implementing the session management function is a combined entity for a packet data network gateway control function of the first network and a session management function of the second network.

3. A method performed by an entity in a first network of a mobile communication system that implements a mobility management function, the method comprising:

receiving, from a terminal in the mobile communication system, first information indicating whether the terminal supports a second network and access point name (APN) information;

determining second information on an entity implementing a session management function based on the first information and the APN information;

transmitting, to the entity implementing the session management function, a request for creating a packet data unit (PDU) session for the terminal; and transmitting, to a server, the second information on the entity implementing the session management function.

4. The method of claim 3, further comprising:

receiving, from the server, third information on an entity implementing the session management function updated in the server by an entity implementing the session management function of the second network, in case that the PDU session is created in the second network.

5. The method of claim 3, wherein the second information on the entity implementing the session management function is provided from the server to an entity implementing the mobility management function of the second network, based on a request of the entity implementing the mobility management function of the second network.

6. A terminal in a first network of a mobile communication system, the terminal comprising:

a transceiver; and a controller configured to:

control the transceiver to transmit, to an entity implementing a mobility management function in a first network of a mobile communication system, first information indicating whether the terminal supports a second network and access point name (APN) information, wherein second information on an entity implementing a session management function is determined, by the entity implementing the mobility management function, based on the first information and the APN information, wherein a request for creating a packet data unit (PDU) session for the terminal is transmitted, by the entity implementing the mobility management function of the first network, to the entity implementing the session management function of the first network, and wherein the second information on the entity implementing the session management function is transmitted to a server.

7. The terminal of claim 6, wherein third information is transmitted from the server to the entity implementing the session management function, the third information on an entity implementing the session management function updated in the server by an entity implementing the session management function of the second network, in case that the PDU session is created in the second network, and wherein the entity implementing the session management function is a combined entity for a packet data network gateway control function of the first network and a session management function of the second network.

8. An entity in a first network of a mobile communication system that implements a mobility management function, the entity comprising:

a transceiver; and a controller configured to:

control the transceiver to receive, from a terminal in the mobile communication system, first information indicating whether the terminal supports a second network and access point name (APN) information, determine second information on an entity implementing a session management function based on the first information and the APN information, control the transceiver to transmit, to the entity implementing the session management function, a request for creating a packet data unit (PDU) session for the terminal, and control the transceiver to transmit to a server, the second information on the entity implementing the session management function.

9. The entity of claim 8, wherein the controller is further configured to control the transceiver to receive, from the server, third information on an entity implementing the session management function updated in the server by an entity implementing the session management function of the second network, in case that the PDU session is created in the second network.

10. The entity of claim 8, wherein the entity implementing the session management function is a combined entity for a packet data network gateway control function of the first network and a session management function of the second network.

11. The entity of claim 8, wherein the second information on the entity implementing the session management function is provided from the server to an entity implementing the mobility management function of the second network, based on a request of the entity implementing the mobility management function of the second network.

12. The method of claim 3, wherein the entity implementing the session management function is a combined entity for a packet data network gateway control function of the first network and a session management function of the second network.

13. The method of claim 5, wherein the request of the entity implementing the mobility management function of the second network is based on a mobility of the terminal from a first network to a second network, and wherein the first network is a long term evolution (LTE) network and the second network is a 5G network.

14. The method of claim 3, wherein the second information on the entity implementing the session management function is stored by the server.

15. The method of claim 3, wherein the second information includes an identifier (ID) of the entity implementing the session management function.

16. The entity of claim 11, wherein the request of the entity implementing the mobility management function of the second network is based on a mobility of the terminal from a first network to a second network, and wherein the first network is a long term evolution (LTE) network and the second network is a 5G network.

17. The entity of claim 8, wherein the second information on the entity implementing the session management function is stored by the server.

18. The entity of claim 8, wherein the second information includes an identifier (ID) of the entity implementing the session management function.

\* \* \* \* \*